United States Patent
Guo et al.

(10) Patent No.: US 11,164,584 B2
(45) Date of Patent: Nov. 2, 2021

(54) SYSTEM AND METHOD FOR UNINTERRUPTED APPLICATION AWAKENING AND SPEECH RECOGNITION

(71) Applicant: BEIJING DIDI INFINITY TECHNOLOGY AND DEVELOPMENT CO., LTD., Beijing (CN)

(72) Inventors: Liting Guo, Beijing (CN); Gangtao Hu, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 155 days.

(21) Appl. No.: 16/563,981

(22) Filed: Sep. 9, 2019

(65) Prior Publication Data

US 2020/0035243 A1 Jan. 30, 2020

Related U.S. Application Data

(63) Continuation of application No. PCT/CN2017/107514, filed on Oct. 24, 2017.

(51) Int. Cl.
  *G10L 15/22* (2006.01)
  *G10L 15/26* (2006.01)
  *G10L 15/05* (2013.01)

(52) U.S. Cl.
  CPC ............ *G10L 15/26* (2013.01); *G10L 15/05* (2013.01); *G10L 15/22* (2013.01); *G10L 2015/223* (2013.01)

(58) Field of Classification Search
  CPC .............. G10L 15/22; G10L 2015/223; G10L 15/1815; G10L 15/26; G10L 2015/088;
  (Continued)

(56) References Cited

U.S. PATENT DOCUMENTS 5,797,123 A * 8/1998 Chou ...................... G10L 15/18
                                                               704/240
5,983,186 A    11/1999 Miyazawa et al.
(Continued)

FOREIGN PATENT DOCUMENTS

CN  103729193 A   4/2014
CN  106205607 A  12/2016
(Continued)

OTHER PUBLICATIONS

International Search Report PCT/CN2017/107514 dated Jul. 20, 2018, 5 pages.
(Continued)

*Primary Examiner* — Vijay B Chawan
(74) *Attorney, Agent, or Firm* — Sheppard Mullin Richter & Hampton LLP

(57) ABSTRACT

Systems and methods are provided for application awakening and speech recognition. Such system may comprise a microphone configured to record an audio in an audio queue. The system may further comprise a processor configured to monitor the audio queue for an awakening phrase, in response to detecting the awakening phrase, obtain an audio segment from the audio queue, and transmit the obtained audio segment to a server. The recording of the audio may be continuous from a beginning of the awakening phrase to an end of the audio segment.

17 Claims, 6 Drawing Sheets

(58) Field of Classification Search
CPC ..... G10L 13/00; G10L 15/1822; G10L 15/30; G10L 17/22; G10L 25/78; G10L 25/84; G10L 15/02; G10L 15/063; G10L 15/18; G10L 15/1807; G10L 15/20; G10L 15/15; G10L 15/24; G10L 21/0264; G10L 25/21; G10L 25/30; G10L 25/48; G10L 15/05
USPC .... 704/275, 240, 255, 256.5, 257, 231, 251, 704/9
See application file for complete search history.

(56) References Cited

U.S. PATENT DOCUMENTS

| | | | |
|---|---|---|---|
| 9,633,661 B1* | 4/2017 | Typrin | G10L 15/02 |
| 10,237,137 B2* | 3/2019 | Helvey | H04L 12/1432 |
| 2013/0033643 A1* | 2/2013 | Kim | H04N 21/44218 |
| | | | 348/563 |
| 2013/0325484 A1* | 12/2013 | Chakladar | G10L 15/22 |
| | | | 704/275 |
| 2014/0270197 A1* | 9/2014 | Krishnamurthy | H04M 1/6008 |
| | | | 381/56 |
| 2015/0276254 A1* | 10/2015 | Nemcek | F24D 19/1084 |
| | | | 700/278 |
| 2016/0155443 A1* | 6/2016 | Khan | G06F 1/3203 |
| | | | 704/275 |
| 2016/0343376 A1* | 11/2016 | Cai | G10L 17/22 |
| 2017/0054849 A1* | 2/2017 | Torre | H04M 3/5141 |
| 2017/0162198 A1* | 6/2017 | Chakladar | G10L 15/26 |
| 2017/0270914 A1* | 9/2017 | Clark | G10L 15/1807 |
| 2018/0077025 A1* | 3/2018 | Helvey | H04L 67/125 |
| 2018/0166076 A1* | 6/2018 | Higuchi | G06F 16/00 |
| 2018/0174583 A1* | 6/2018 | Zhao | G10L 15/22 |
| 2020/0076696 A1* | 3/2020 | Helvey | H04L 41/046 |

FOREIGN PATENT DOCUMENTS

| | | | | |
|---|---|---|---|---|
| CN | 106531167 A | | 3/2017 | |
| CN | 106782554 A | | 5/2017 | |
| WO | WO-2019/079974 A1 * | 5/2019 | | G10L 15/04 |

OTHER PUBLICATIONS

Written Opinion in PCT/CN2017/107514 dated Jul. 20, 2016 4 pages.

* cited by examiner

410

411: Monitor the audio queue for a first absence of voice activity, wherein the first absence of voice activity corresponds to a first-detected duration in the audio queue after the awakening phrase with no voice recorded and exceeding a first preset threshold ↓ Detecting the first absence of voice activity exceeding the first preset threshold

412: Monitor the audio queue for a first presence of voice activity after the first absence of voice activity, wherein the first presence of voice activity corresponds to a first-detected duration with voice recorded in the audio queue after the first absence of voice activity ↙ Not detecting the first presence of voice activity within a second preset threshold from an end of the awakening phrase ↘ Detecting the first presence of voice activity within the second preset threshold from an end of the awakening phrase

413: Obtain the audio segment comprising at least a portion of the audio queue from the end of the awakening phrase to a start of the first absence of voice activity

414: Monitor the audio queue for a second absence of voice activity, wherein the second absence of voice activity corresponds to a first-detected duration in the audio queue after the first presence of voice with no voice recorded and exceeding the first preset threshold ↓ Detecting the second absence of voice activity

415: Obtain the audio segment comprising at least a portion of the audio queue from a start of the first presence of voice activity to an end of the first presence of voice activity

FIG. 4B

SYSTEM AND METHOD FOR UNINTERRUPTED APPLICATION AWAKENING AND SPEECH RECOGNITION

CROSS-REFERENCE TO RELATED APPLICATIONS

This application is a continuation of international Application No. PCT/CN2017/107514, filed on Oct. 24, 2017, the entire contents of which are incorporated herein by reference.

TECHNICAL FIELD

This disclosure generally relates to approaches and techniques for application awakening and speech recognition.

BACKGROUND

Advances in human-machine interactions can allow people to use their voices to effectuate control. For example, traditional instruction inputs via keyboard, mouse, or touch screen for triggering various applications or processes can be achieved with speeches. Nevertheless, many hurdles are yet to be overcome to streamline the process.

SUMMARY

Various embodiments of the present disclosure include systems, methods, and non-transitory computer readable medium for application awakening and speech recognition. An exemplary system may comprise a microphone configured to record an audio in an audio queue. The system may further comprise a processor configured to monitor the audio queue for an awakening phrase, in response to detecting the awakening phrase, obtain an audio segment from the audio queue, and transmit the obtained audio segment to a server. The recording of the audio may be continuous from a beginning of the awakening phrase to an end of the audio segment.

In some embodiments, the exemplary system may be implemented on a mobile device including a mobile phone. The server may be caused to perform speech recognition on the audio segment and return information to the mobile device based on the speech recognition.

In some embodiments, the exemplary system may further comprise a display configured to display the returned information. The returned information may comprise texts of a machine-recognized speech corresponding to the audio segment.

In some embodiments, the audio queue may be associated with time. To monitor the audio queue for the awakening phrase, the processor may be configured to screen the recorded audio for a match with the awakening phrase.

In some embodiments, the recording of the audio in the audio queue may be continuous throughout the detection of the awakening phrase.

In some embodiments, to obtain the audio segment from the audio queue in response to detecting the awakening phrase, the processor may be configured to monitor the audio queue for a first absence of voice activity, wherein the first absence of voice activity corresponds to a first-detected duration in the audio queue after the awakening phrase with no voice recorded and exceeding a first preset threshold. The processor may be further configured to, in response to detecting the first absence of voice activity exceeding the first preset threshold, monitor the audio queue for a first presence of voice activity after the first absence of voice activity, wherein the first presence of voice activity corresponds to a first-detected duration with voice recorded in the audio queue after the first absence of voice activity. The processor may be further configured to, in response to not detecting the first presence of voice activity within a second preset threshold from an end of the awakening phrase, obtain the audio segment comprising at least a portion of the audio queue from the end of the awakening phrase to a start of the first absence of voice activity.

In some embodiments, the audio segment further comprises the awakening phrase.

In some embodiments, to obtain the audio segment from the audio queue in response to detecting the awakening phrase, the processor may be configured to monitor the audio queue for a first absence of voice activity, wherein the first absence of voice activity corresponds to a first-detected duration in the audio queue after the awakening phrase with no voice recorded and exceeding a first preset threshold. The processor may be further configured to, in response to detecting the first absence of voice activity exceeding the first preset threshold, monitor the audio queue for a first presence of voice activity after the first absence of voice activity, wherein the first presence of voice activity corresponds to a first-detected duration with voice recorded in the audio queue after the first absence of voice activity. The processor may be further configured to, in response to detecting the first presence of voice activity within a second preset threshold from an end of the awakening phrase, monitor the audio queue for a second absence of voice activity, wherein the second absence of voice activity corresponds to a first-detected duration in the audio queue after the first presence of voice with no voice recorded and exceeding the first preset threshold. The processor may be further configured to, in response to detecting the second absence of voice activity, obtain the audio segment comprising at least a portion of the audio queue from a start of the first presence of voice activity to an end of the first presence of voice activity.

In some embodiments, the first preset threshold may be 700 milliseconds, and the second preset threshold may be longer than the first preset threshold.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 4A and 4B illustrate flowcharts of an example method for uninterrupted application awakening and speech recognition, in accordance with various embodiments.

DETAILED DESCRIPTION

Figure 1:
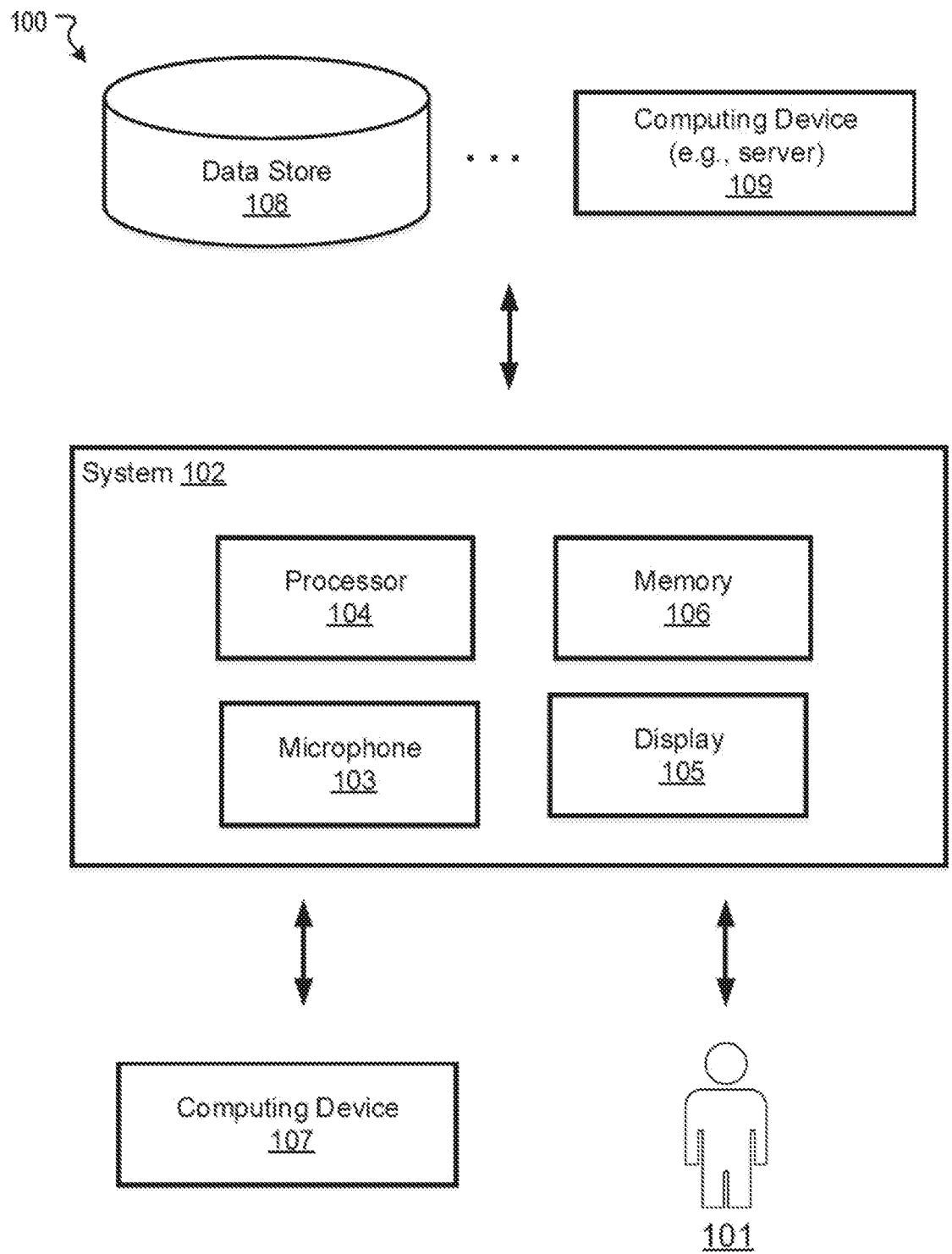
FIG. 1 illustrates an example environment for uninterrupted application awakening and speech recognition, in accordance with various embodiments.

Existing application awakening and speech recognition are performed separately and discontinuously, causing inaccurate recognition and incoherent user experience. For example, when speaking to an audio capturing device to execute certain instructions, a user has to say certain keyword to awaken the application at stage (1) and pause for the device to recognize the awakening phrase, before saying the instructions at stage (2). To current technologies, the pause is necessary for the device to end the stage (1) voice capture, recognize the awakening phrase, and awaken a corresponding application in preparation for recognizing the instructions by starting the stage (2) voice capture. The pause may take a few seconds. Correspondingly, the audio capturing device turns on a voice recorder for the stage (1) and turns the voice recorder off upon detecting the awakening phrase. The voice recorder is not turned back on until the stage (2). Thus, to comply with the current technology settings, the user is forced to speak in an unnatural way. If the user speaks continuously between the two stages without the pause, some of the instructions may be accidentally captured in stage (1) instead of stage (2) or a part of the keyword (awakening phrase) may fall into stage (2) instead of stage (1), causing interferences and inaccurate recognition of the awakening phrase and the instructions. Even if the user pauses, various detection errors may still occur if the pause is not long enough. Therefore, current technologies are inadequate to provide seamless, natural, and convenient application awakening and speech recognition.

Various embodiments described below can overcome such problems arising in the realm of application awakening and speech recognition. The embodiments can be implemented in various scenarios, such as walking, vehicle hailing, driving with navigation, driving while searching internet, and so on when typing is unrealistic or inconvenient. For example, to order a vehicle service for transportation, a user can speak continuously to a mobile phone (e.g., "XYZ, get me a ride to metro center"), when a corresponding Application is activated. Based on the disclosed system, the mobile phone can awaken a function based on recognizing the awakening phrase "XYZ" and obtain the instruction "get me a ride to metro center." The mobile phone may further send the instruction "get me a ride to metro center" to a server, causing the server to determine an address corresponding to "metro center" and a vehicle to implement this transportation. Upon receiving corresponding information from the server, the mobile phone can display an indication of an acceptance of the transportation request to "metro center," information of the vehicle, and arrangement for pick-up. The user can, but does not have to, pause between the awakening phrase "XYZ" and the instructions "get me . . . ." The disclosed system and method can automatically determine if the user intended to end the instructions or merely pause before saying the instructions, accommodating various user scenarios. Accordingly, the audio capture and speech recognition can be completed seamlessly with improved accuracy.

In various embodiments, an exemplary system for application awakening and speech recognition may comprise a microphone configured to record an audio in an audio queue. The system may further comprise a processor configured to monitor the audio queue for an awakening phrase, in response to detecting the awakening phrase, obtain an audio segment from the audio queue, and transmit the obtained audio segment to a server. The recording of the audio may be continuous from a beginning of the awakening phrase to an end of the audio segment.

In some embodiments, the exemplary system may be implemented on a mobile device including a mobile phone. The server may be caused to perform speech recognition on the audio segment and return information to the mobile device based on the speech recognition. In some embodiments, the exemplary system may further comprise a display configured to display the returned information. The returned information may comprise texts of a machine-recognized speech corresponding to the audio segment.

In some embodiments, the audio queue may be associated with time. To monitor the audio queue for the awakening phrase, the processor may be configured to screen the recorded audio for a match with the awakening phrase. In some embodiments, the recording of the audio in the audio queue may be continuous throughout the detection of the awakening phrase.

In some embodiments, to obtain the audio segment from the audio queue in response to detecting the awakening phrase, the processor may be configured to monitor the audio queue for a first absence of voice activity, wherein the first absence of voice activity corresponds to a first-detected duration in the audio queue after the awakening phrase with no voice recorded and exceeding a first preset threshold. The processor may be further configured to, in response to detecting the first absence of voice activity exceeding the first preset threshold, monitor the audio queue for a first presence of voice activity after the first absence of voice activity, wherein the first presence of voice activity corresponds to a first-detected duration with voice recorded in the audio queue after the first absence of voice activity. The processor may be further configured to, in response to not detecting the first presence of voice activity within a second preset threshold from an end of the awakening phrase, obtain the audio segment comprising at least a portion of the audio queue from the end of the awakening phrase to a start of the first absence of voice activity. In some embodiments, the audio segment further comprises the awakening phrase.

In some embodiments, to obtain the audio segment from the audio queue in response to detecting the awakening phrase, the processor may be configured to monitor the audio queue for a first absence of voice activity, wherein the first absence of voice activity corresponds to a first-detected duration in the audio queue after the awakening phrase with no voice recorded and exceeding a first preset threshold. The processor may be further configured to, in response to detecting the first absence of voice activity exceeding the first preset threshold, monitor the audio queue for a first presence of voice activity after the first absence of voice activity, wherein the first presence of voice activity corresponds to a first-detected duration with voice recorded in the audio queue after the first absence of voice activity. The processor may be further configured to, in response to detecting the first presence of voice activity within a second preset threshold from an end of the awakening phrase, monitor the audio queue for a second absence of voice activity, wherein the second absence of voice activity corresponds to a first-detected duration in the audio queue after the first presence of voice with no voice recorded and exceeding the first preset threshold. The processor may be further configured to, in response to detecting the second absence of voice activity, obtain the audio segment comprising at least a portion of the audio queue from a start of the first presence of voice activity to an end of the first presence of voice activity. In some embodiments, the audio segment further comprises the awakening phrase. In some embodiments, the first preset threshold may be 700 milliseconds, and the second preset threshold may be longer than the first preset threshold.

FIG. 1 illustrates an example environment 100 for uninterrupted application awakening and speech recognition, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may further comprise a microphone 103 configured to capture audio inputs (e.g., human speeches or voices). Here, any other alternative audio capturing device may be used as the microphone 103. The audio inputs may be captured from a computing device 107 or a user 101. The computing device 107 (e.g., cellphone, tablet, computer, wearable device (smart watch)) may transmit and/or play information (e.g., a recorded audio) to the system 102. The user 101 may speak within the detection range of the microphone 103 for audio capture. Optionally, the system 102 may further comprise a display 105 configured to display information (e.g., texts of recognized speeches). The display 105 may comprise a touch screen. The system 102 may be implemented on or as various devices such as cellphone, tablet, computer, wearable device (smart watch), etc. The system 102 above may be installed with appropriate software (e.g., Application, platform program, etc.) and/or hardware (e.g., wires, wireless connections, etc.) to access other devices of the environment 100.

The environment 100 may include one or more data stores (e.g., a data store 108) and one or more computing devices (e.g., a computing device 109) that are accessible to the system 102. In some embodiments, the system 102 may be configured to exchange data or information with the data store 108 and/or the computing device 109. For example, the data store 108 may be installed in a computer for storing address information. The computing device 109 may be a server configured to perform speech recognition. The server may be configured to receive audio inputs and apply various models (e.g., Hidden Markov Model, dynamic time warping-based speech recognition, neural network) to the audio inputs to recognize one or more voices (e.g., human voices) and obtain texts corresponding to the voices.

In some embodiments, the data store 108 and/or computing device 109 may implement an online information or service platform. The service may be associated with vehicles (e.g., cars, bikes, boats, airplanes, etc.), and the platform may be referred to as a vehicle service hailing platform. The platform may accept requests for transportation, identify vehicles to fulfill the requests, arrange for pick-ups, and process transactions. For example, a user may use the system 102 (e.g., a mobile phone installed with an Application associated with the platform) to access the platform. Some platform data (e.g., vehicle information, vehicle driver information, address information, etc.) may be stored in the memory 106 or retrievable from the data store 108 and/or the computing device 109. In some embodiments, the user may speak to the system 102 to submit a request (e.g., a vehicle hailing request). As described herein, the system 102, the data store 108, and/or the computing device 109 may work together to capture and process the speech of the user to fulfill the request.

In some embodiments, the system 102 and one or more of the computing devices (e.g., the computing device 109) may be integrated in a single device or system. Alternatively, the system 102 and the computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the computing device 109 is shown as a single component in this figure, it is appreciated that the computing device 109 can be implemented as a single device or multiple devices (e.g., computers, servers, etc.) coupled together. The computing device may couple to and interact with multiple systems like the system 102. In general, the system 102, the computing device 109, and the data store 108 may be able to communicate with one another through one or more wired or wireless networks (e.g., the Internet) through which data can be communicated. Various aspects of the environment 100 are described below in reference to FIG. 2 to FIG. 5.

Figure 2:
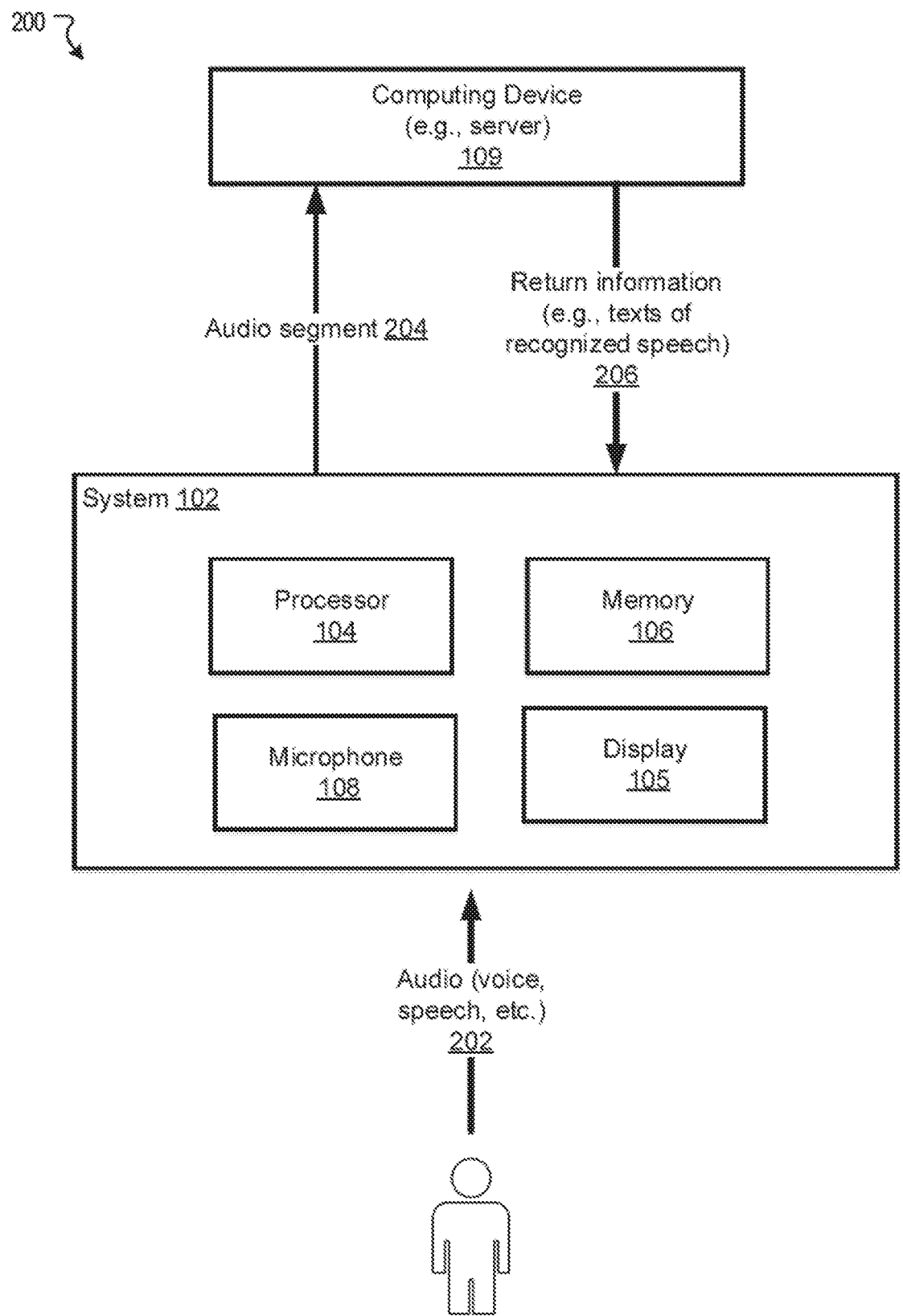
FIG. 2 illustrates an example system for uninterrupted application awakening and speech recognition, in accordance with various embodiments.

FIG. 2 illustrates an example system 200 for uninterrupted application awakening and speech recognition, in accordance with various embodiments. The operations shown in FIG. 2 and presented below are intended to be illustrative. The various devices and components in FIG. 2 are similar to those described in FIG. 1, except that the data store 108 and the computing device 107 are removed for simplicity.

In various embodiments, the system 102 may be implemented on a mobile device including a mobile phone. One or more components of the system 102 (e.g., the microphone 108, the processor 104, and/or the memory 106) may be configured to record an audio (e.g., audio 202) in an audio queue. The audio 202 may comprise a speech (e.g., sentences, phrases, words) spoken by a human. The speech can be in any language. The processor 104 may be configured to control the start and stop of the recording. For example, when entering a preset interface of an Application on the device or opening the Application as described above, the recording may start. The processor 104 may control an analogue to digital signal converter (ADC) of the system 102 (not shown in this figure) to convert the captured audio into digital format and store in the audio queue. The audio queue may be associated with time and may comprise time-series data of the captured audio. The audio queue may be stored in various audio file formats (e.g., a WAV file). The audio queue may be stored in the memory 106, in a cache, or another storage medium. The audio queue may not be limited to a particular operating system, and various alternative audio buffer, audio cache, audio streaming, or audio callback techniques can be used in place of the audio queue. The audio queue may be configured to capture only the latest audio (e.g., the last minute of audio capture, the last 1G audio file, etc.). For example, the captured audio may be continuously streamed to a cache of a limited size, and the latest audio portion in excess of the limit is written over the oldest audio portion.

In some embodiments, one or more components of the system 102 (e.g., the processor 104 and/or the memory 106) may be configured to monitor the audio queue for an awakening phrase, obtain an audio segment from the audio queue in response to detecting the awakening phrase, and transmit the obtained audio segment (e.g., the audio segment 204) to the computing device 109 (e.g., a server). In some embodiments, the recording of the audio described above may be continuous and uninterrupted at least from a beginning of the awakening phrase to an end of the audio segment. Details for obtaining the audio segment are described below with reference to FIG. 3.

In some embodiments, the processor 104 and/or the memory 106 of the system 102 may be configured to perform speech recognition on the audio queue in real time to screen for the awakening phrase. To monitor the audio queue for the awakening phrase, the processor may be configured to screen the recorded audio for a match with the awakening phrase. The awakening phrase can comprise one or more words or phrases. The awakening phrase may be considered as a part of the speech spoken by a user in the user's voice. The awakening phrase may comprise a name or greeting (e.g., "Hello XYZ") and may be associated with an application, a preset program, function, or process (e.g., application XYZ). For example, the system 102 may, upon detecting the awakening phrase in the audio queue, trigger steps to obtain the audio segment. Here, "awakening" does not necessarily imply awakening from a "sleeping mode." Before awakening, the system 102 may be sleeping, idle, or performing other tasks. Whether detecting the awakening phrase or not, the microphone 108 may continue performing the recording, and the system 102 may not stop or pause the recording. That is, the recording of the audio in the audio queue is continuous throughout the detection of the awakening phrase (e.g., from before to after detecting the awakening phrase as long as staying in the preset interface described above or at a similar preset status). The system 102 may obtain the audio segment 204 in response to detecting the awakening phrase, and transmit the obtained audio segment 204 to the computing device 109. The audio segment 204 may also comprise a part of the speech spoken by the user in the user's voice. The audio segment 204 may or may not comprise the awakening phrase.

In some embodiments, the computing device 109 may be caused to perform speech recognition on the audio segment 204 and return information 206 (e.g., texts of recognized speech) to the system 102 at least based on the speech recognition. The display 105 of the system 102 may be configured to display the returned information. The returned information may comprise texts of a machine-recognized speech corresponding to the audio segment.

As such, speech recognition may be performed at the system 102 and/or the computing device 109. The speech recognition can enable recognition and translation of audio signals of spoken languages and phrases into texts by a machine, such as server, computer, or mobile phone. In principle, the machine may extract features from the audio (e.g., the audio queue, the audio segment) to generate speech fingerprint. The machine may compare the generated speech fingerprint with from a word fingerprint template (e.g., a lexicon stored in the memory 106, another lexicon stored in the computing device 109) to select the most matching word(s). Lexicons contain the mapping between the written representations and the pronunciations of words or short phrases. The lexicon may be known as a part of an acoustic model. The acoustic model may represent the relationship between the audio signal of the captured speech and phonemes or other linguistic units that make up the speech, thus relating the audio signal to words. The acoustic model (e.g., Viterbi algorithm, Hidden Markov Model) may be used to identify the most matching texts with the audio signals based on extracting character vectors and model training. Further, the machine may compare the selected word(s) with a sentence fingerprint template (e.g., a grammar and semantics model stored in the memory 106, another grammar and semantics model stored in the computing device 109) to select the most matching sentence to distinguish between words and phrases that sound similar. The grammar and semantics model may be known as a part of a language model. The language model represents a probability distribution over a sequence of words, each determined from the acoustic model. For example, the probability of a sentence can be expressed as a chain product of probabilities of all words in the sentence. In particular, the N-gram model can be used as a language model. After obtaining a recognized speech output (e.g., a phrase, a sentence), the comparison and selection steps (e.g., algorithms) can be trained by feedbacking the output (whether correct or incorrect).

Though both utilizing the principles of speech recognition, the speech recognition model on the system 102 may be simpler than the speech recognition model on the computing device 109. The system 102 may have to screen for only one phrase from the captured audio: the preset awakening phrase. Therefore, the system 102 may only need the acoustic model for word comparison and selection. Even if the system 102 uses both the acoustic model and the language model, they may be much simpler because of the smaller task amount for recognition. As described below, the awakening phrase can cause the system 102 to obtain speeches coming after the awakening phrase from the audio queue and transmit them to the computing device 109, causing the computing device 109 to recognize the speeches.

Figure 3:
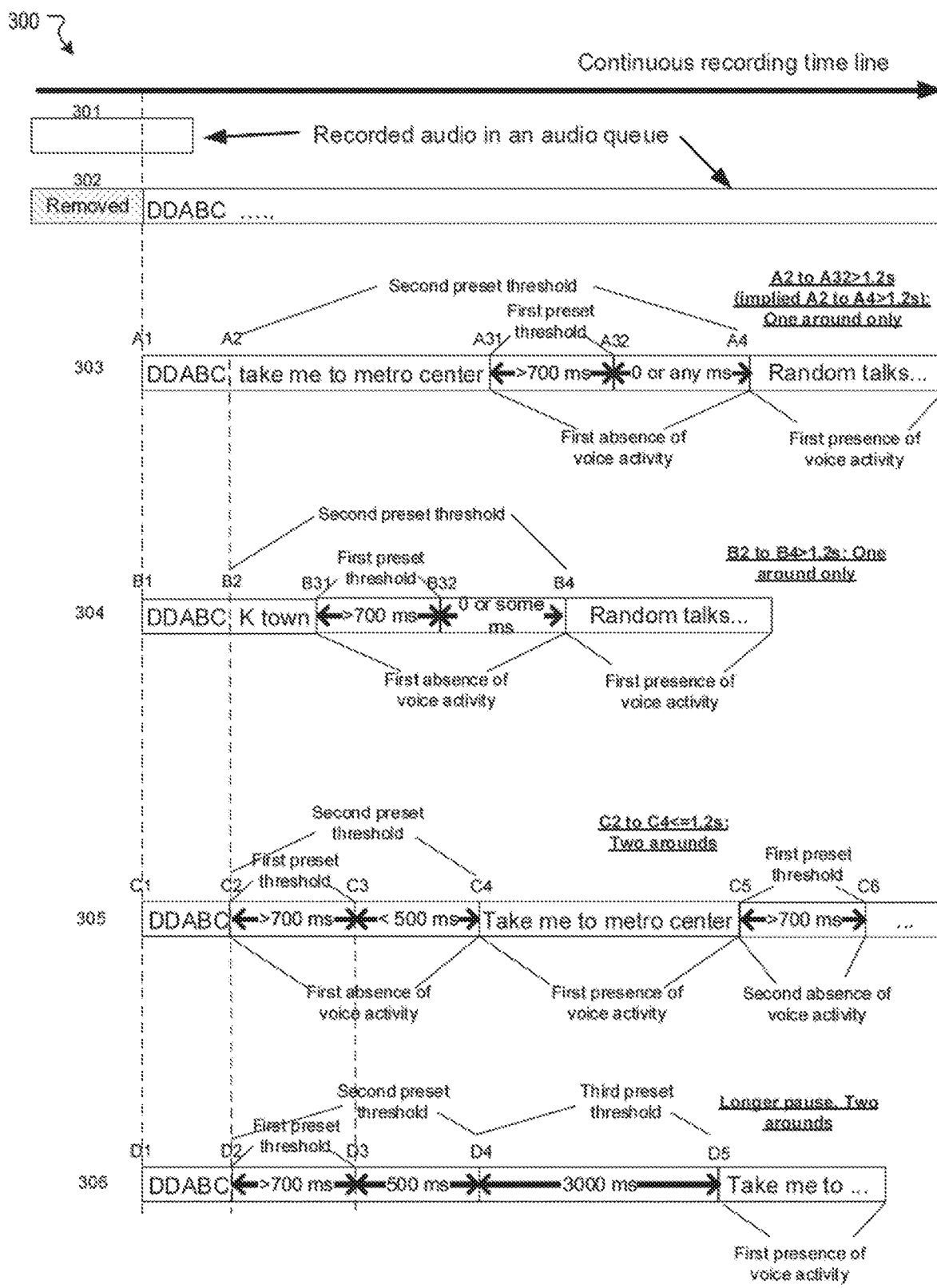
FIG. 3 illustrates example speeches recognized by uninterrupted application awakening and speech recognition, in accordance with various embodiments.

FIG. 3 illustrates example speeches recognized by uninterrupted application awakening and speech recognition, in accordance with various embodiments. The training 300 may be implemented in various environments including, for example, the environment 100 of FIG. 1. The audio capturing and speech recognition shown in FIG. 3 and various steps described below with reference to each audio queue may be implemented by one or more components of the environment 100 (e.g., the processor 104 and/or the memory 106 of the system 102). The description of FIG. 3 is intended to be illustrative and may be modified in various ways according to the implementation.

FIG. 3 shows audio queues 301-306 (horizontal bars) at various stages of the audio capturing and speech recognition in a continuous time series in the x-axis direction. Some of the audio queue are labelled with the corresponding speeches. In FIG. 3, the preset awakening phrase is "DDABC." Various timestamps (e.g., A1, C4) may be labelled on the corresponding audio queue.

Referring to the audio queue 301, in some embodiments, captured audio may be stored in the audio queue 301, which extends in the x-axis direction as recent audio is captured.

Referring to the audio queue 302, in some embodiments, upon detecting the awakening phrase "DDABC," recorded audio data in the audio queue prior to the awakening phrase may be optionally deleted, while continuing capturing forthcoming audio data. The deletion may be similarly performed to the audio queues 303-306 described below, upon detecting the awakening phrase A1 to A2 of the audio queue 303, B1 to B2 of the audio queue 304, C1 to C2 of the audio queue 305, and D1 to D2 of the audio queue 306 respectively. The deletion may create for space for the forthcoming audio. In some embodiments, the deletion may not be performed. By marking the timestamp of the start of the awakening phrase and using it as a reference point in the audio queue, audio data recorded after the marked timestamp can be obtained from the audio queue as relevant data for speech recognition without the interference from audio data recorded before the marked timestamp and the burden of excessive data. By either method, the timestamps of the start and the end of the awakening phrase (e.g., A1, A2, B1, B2, C1, C2, D1, D2) may be obtained and stored.

Referring to the audio queues 303-306, in some embodiments, to obtain the audio segment from the audio queue in response to detecting the awakening phrase (as described above with reference to FIG. 2), the audio queue may be monitored for a first absence of voice activity, wherein the first absence of voice activity corresponds to a first-detected duration in the audio queue after the awakening phrase with no voice recorded and exceeding a first preset threshold. For example, such first-detected duration after the awakening phrase may be A31 to A32 of the audio queue 303 after the speech "take me to metro center," B31 to B32 of the audio queue 304 after the speech "K town," C2 to C3 of the audio queue 305 after the awakening phrase "DDABC," or D2 to D3 of the audio queue 306 after the awakening phrase "DDABC." This step may be known as voice activity detection (VAD) to detect an end of a speech or an end of a part of a speech. VAD can be implemented via steps including noise reduction, feature extraction, and applying a classification rule. Here, by detecting a sufficiently long absence of voice (e.g., for more than the first preset threshold shown in this figure), the end can be determined. The first preset threshold may be configurable (e.g., 700 milliseconds as shown). By statistical analysis from real life audio samples, durations around 700 milliseconds may be appropriate for VAD determination.

In some embodiments, in response to detecting the first absence of voice activity exceeding the first preset threshold, the audio queue may be monitored for a first presence of voice activity after the first absence of voice activity, wherein the first presence of voice activity corresponds to a first-detected duration with voice recorded in the audio queue after the first absence of voice activity. For example, such first-detected duration after the first absence of voice activity may be A4 and onwards of the audio queue 303 labeled as "random talks," B4 and onwards of the audio queue 304 labeled as "random talks," C4 to C5 of the audio queue 305 labelled as "take me to metro center," or D5 and onwards of the audio queue 306 labelled as "take me to . . . " The timestamp of the start of the first-detected duration after the first absence of voice activity (e.g., A4, B4, C4, D5) may be obtained and stored. Similarly, various durations corresponding to a presence of voice activity and an absence of activity as described below and comparisons therebetween can be obtained based on their corresponding timestamps. For example, a duration from A2 to A4 can be obtained by subtracting A1 to A2 from A1 to A4.

In some embodiments, in response to not detecting the first presence of voice activity within a second preset threshold from an end of the awakening phrase, the audio segment may be obtained, the audio segment comprising at least a portion of the audio queue from an end of the awakening phrase to a start of the absence of voice activity. For example, for the audio queue 303, if A2 to A4 is larger than the second preset threshold, the audio segment may be obtained to at least comprise A2 to A31. The audio segment may alternatively comprise at least A1 to A31 (from a start of the awakening phrase to a start of the first absence of voice activity). The inclusion of the awakening phrase in the audio segment may increase detection accuracy by eliminating an inaccurate determination of A2. Determining A2 too early (e.g., within the awakening phrase) may bring parts of the awakening phrase into the instruction "take me to metro center," causing the server to erroneously determine at least the beginning of the instruction. Determining A2 too later (e.g., missing the first word "take" also causes error, when the server performs speech recognition on an incomplete instruction.

In some embodiments, as described below with reference to the audio queue 305, the second preset threshold can be used to determine if the user intended to end the speech, or merely paused between the awakening phrase and other speeches (e.g., the instruction). For the prior case, as shown with reference to the audio queue 303 or 304, only one round of capture is needed. For the latter case, as shown with reference to the audio queue 305, two rounds of capture are needed. Two rounds may not imply stopping and resuming the audio recording, because as described above the recording is continuous and uninterrupted. Due to the VAD detection of exceeding the first preset threshold, a signal indicating a preliminary stop may be generated corresponding to a "first round" of capture. But the stop is to be confirmed based on the second preset threshold corresponding to a "second round" of capture. Thus, the "rounds" may be interpreted as internal process labels by the machine in the process of capturing a complete "awakening phrase +instruction" by a user. The second preset threshold may be configurable (e.g., 1200 milliseconds=700 milliseconds+ 500 milliseconds for the audio queues 303-305, 4200 milliseconds=700 milliseconds+500 milliseconds+3000 milliseconds for the audio queue 306). For ordinary situations, saying "take me to metro center" usually takes more than 500 milliseconds, and therefore A2 to A4 may exceed the second preset threshold of 1200 milliseconds, no matter how long A32 to A4 is. Thus, only one around round of capture needs to be performed. The additional 500 milliseconds may be useful for covering cases of uttering short speeches after the awakening phrase as discussed below with reference to the audio queue 304.

Referring to the audio queue 304, in some embodiments, the portion of the audio queue from the end of the awakening phrase to the start of the first absence of voice activity (B2 to B31 of "K town") may be 500 milliseconds, and B2 to B4 may exceed the second preset threshold of 1200 milliseconds. Short phrases (e.g., short addresses like "K town") may usually take about 500 milliseconds or longer to utter. Thus, B2 to B32 will exceed the second preset threshold 1200 milliseconds, and only one around of capture needs to be performed. Here, all the durations 500, 700, 1200, and 3000 milliseconds are merely an example and can be adjusted to any length (e.g., the 500 milliseconds can be adjusted to 300 milliseconds to accommodate even shorter addresses).

Referring to the audio queue 305, in some embodiments, the audio queue may be monitored for a first absence of voice activity, wherein the first absence of voice activity corresponds to a first-detected duration in the audio queue after the awakening phrase with no voice recorded and exceeding a first preset threshold. In response to detecting the first absence of voice activity exceeding the first preset threshold (e.g., C2 to C3 exceeding 700 milliseconds), the audio queue may be monitored for a first presence of voice activity after the first absence of voice activity, wherein the first presence of voice activity corresponds to a first-detected duration with voice recorded in the audio queue after the first absence of voice activity. In response to detecting the first presence of voice activity (C4 of C4 to C5) within a second preset threshold from an end of the awakening phrase (e.g., C2 to C4 being less than 1200 milliseconds), the audio queue may be monitored for a second absence of voice activity, wherein the second absence of voice activity corresponds to a first-detected duration in the audio queue after the first presence of voice with no voice recorded and exceeding the first preset threshold (e.g., C5 to C6 exceeding 700 milliseconds). In response to detecting the second absence of voice activity, the audio segment may be obtained, the audio segment comprising at least a portion of the audio queue from a start of the first presence of voice activity to an end of the first presence of voice activity (C4 to C5). The audio segment may alternatively comprise at least C1 to C5 (from a start of the awakening phrase to a start of a second absence of voice activity), and the inclusion of the awakening phrase may increase the speech recognition accuracy as described above.

The audio queue 306 is similar to the audio queue 305, except for an addition of a third preset threshold (e.g., D4 to D5 of 3000 milliseconds) to accommodate a longer pause. Here, after determining the second preset threshold being exceeded, the system 102 may monitor the audio queue 306 for the first presence of voice activity within the third preset threshold similar to the monitoring of the first presence of voice activity in the audio queue 305. If a first presence of voice activity is determined within the third preset threshold, a second round of capture can be performed.

Comparing the audio queues 303, 304, and 305, the first preset threshold can be used to preliminarily determine a stop of the speech, and the second preset threshold can be used to determine if the user intended to end the speech (as in the audio queue 303 or 304 where only one around of capture is needed) or merely paused before saying the instruction (as in the audio queue 305 or 306 where two arounds of capture are needed). Users may pause after saying the awakening phrase because of habits, taking time to recall the address, or various other reasons. Thus, the first preset threshold may be necessary to determine an end of the speech, and the second preset threshold may be necessary to improve accurate capturing of the speech in situations of having a pause after the awakening phrase. Also, short addresses are covered by the application of the second preset threshold. After A4 of the audio queue 303, B4 of the audio queue 304, C6 of the audio queue 305, the system 102 may fall back to the original state of monitoring the audio queue for the awakening phrase.

In view of the above, a user may speak to a device to input information and submit various instructions. The start and end of the instruction can be automatically determined based on the captured speech without using traditional inputting methods, such as typing, pressing, touching, or otherwise physically contacting with the device. That is, the user has to neither touch a part of the device (e.g., a certain area of a touch screen) nor press a part of the device (e.g., a button or key) to signal the start and end of the instruction. Further, the recording may be continuous at least from the start of the awakening phrase to the end of the audio segment, which can be transmitted together to the server for speech recognition, improving the accuracy of the recognition of the instruction.

Figure 4A:
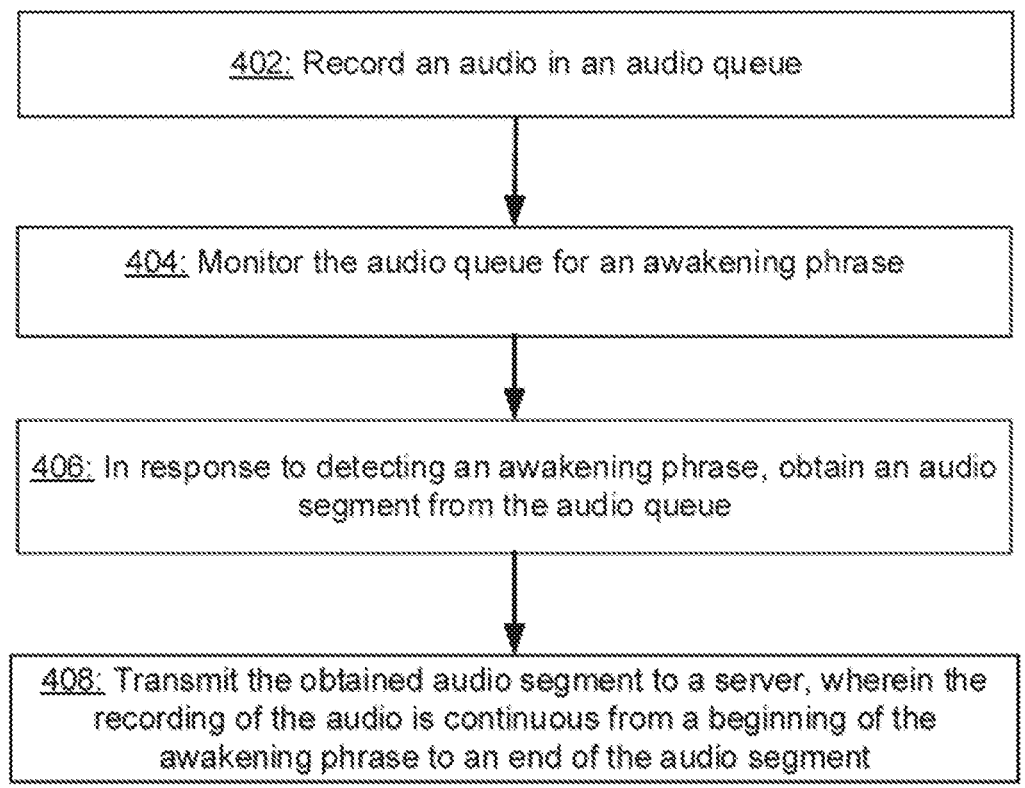

FIG. 4A illustrates a flowchart of an example method 400, according to various embodiments of the present disclosure. FIG. 4B illustrates a flowchart of an example method 410, according to various embodiments of the present disclosure. The methods 400 and 410 may be implemented in various environments including, for example, the environment 100 of FIG. 1. The example methods 400 and 410 may be implemented by one or more components of the system 102 (e.g., the processor 104, the memory 106). The operations of method 400 presented below are intended to be illustrative. Depending on the implementation, the example methods 400 and 410 may include additional, fewer, or alternative steps performed in various orders or in parallel.

For the method 400, at block 402, an audio may be recorded in an audio queue. For example, a microphone may record the audio, and a processor may obtain the recorded audio. At block 404, the audio queue may be monitored for an awakening phrase. At block 406, in response to detecting the awakening phrase, an audio segment may be obtained from the audio queue. The block 406 may further comprise the method 410 described below. At block 408, the obtained audio segment may be transmitted to a server. The server may be caused to perform speech recognition on the audio segment. The recording of the audio may be continuous and uninterrupted at least from a beginning of the awakening phrase to an end of the audio segment.

For the method 410, at block 411, the audio queue may be monitored for a first absence of voice activity, wherein the first absence of voice activity corresponds to a first-detected duration in the audio queue after the awakening phrase with no voice recorded and exceeding a first preset threshold. At block 412, in response to detecting the first absence of voice activity exceeding the first preset threshold, the audio queue may be monitored for a first presence of voice activity after the first absence of voice activity, wherein the first presence of voice activity corresponds to a first-detected duration with voice recorded in the audio queue after the first absence of voice activity. At step 413, in response to not detecting the first presence of voice activity within a second preset threshold, the audio segment may be obtained comprising at least a portion of the audio queue from an end of the awakening phrase to a start of the absence of voice activity. At block 414, in response detecting the first presence of voice activity within the second preset threshold, the audio queue may be monitored for a second absence of voice activity, wherein the second absence of voice activity corresponds to a first-detected duration in the audio queue after the first presence of voice with no voice recorded and exceeding the first preset threshold. At block 415, in response to detecting the second absence of voice activity, the audio segment may be obtained comprising at least a portion of the audio queue from a start of the first presence of voice activity to an end of the first presence of voice activity.

The techniques described herein are implemented by one or more special-purpose computing devices. The special-purpose computing devices may include one or more hardware processors programmed to perform the techniques pursuant to program instructions in firmware, memory, other storage, or a combination. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
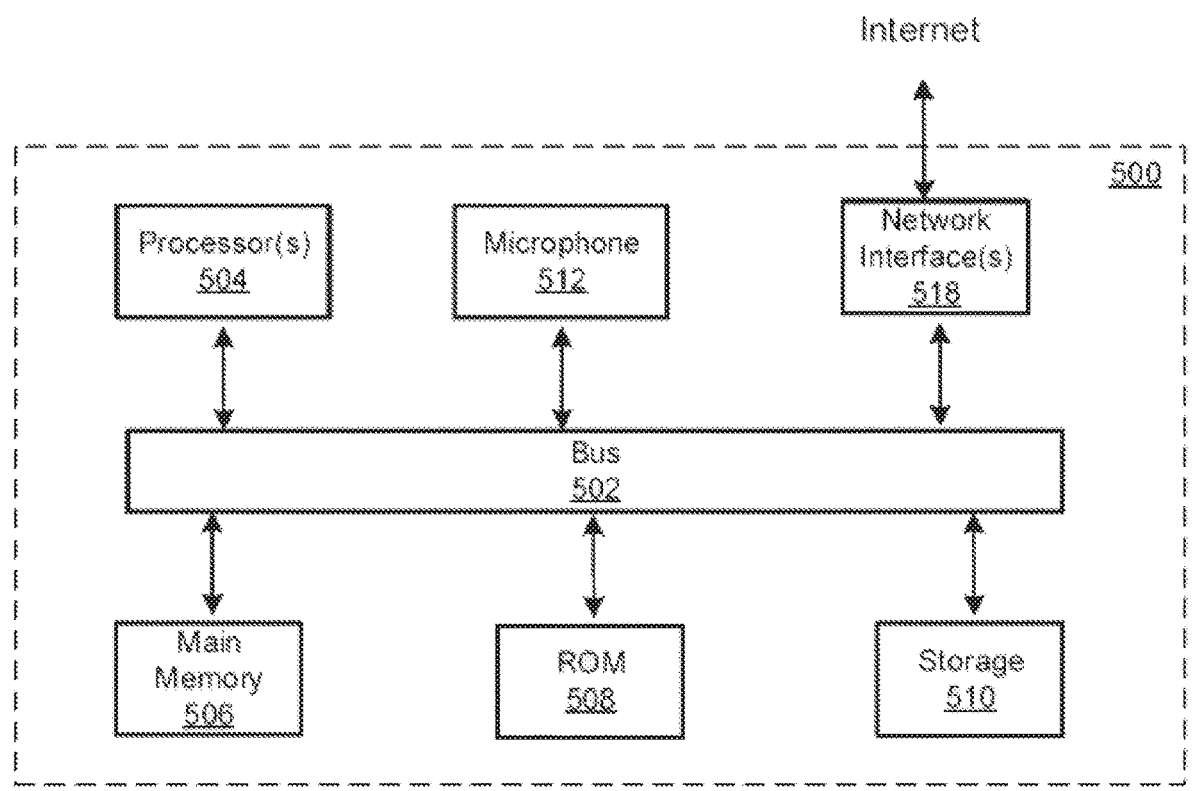
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a microphone 512 or an alternative audio capturing device. The microphone 512 may correspond to the microphone 103 described above.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computing system, comprising:
a microphone configured to record an audio in an audio queue; and
a processor configured to:
monitor the audio queue for an awakening phrase;
in response to detecting the awakening phrase, obtain an audio segment from the audio queue by performing operations comprising:
monitoring the audio queue for a first absence of voice activity, wherein the first absence of voice activity corresponds to a first-detected duration in the audio queue after the awakening phrase with no voice recorded and exceeding a first preset threshold;
in response to detecting the first absence of voice activity exceeding the first preset threshold, monitoring the audio queue for a first presence of voice activity after the first absence of voice activity, wherein the first presence of voice activity corresponds to a first-detected duration with voice recorded in the audio queue after the first absence of voice activity; and
in response to not detecting the first presence of voice activity within a second preset threshold from an end of the awakening phrase, obtaining the audio segment comprising at least a portion of the audio queue from the end of the awakening phrase to a start of the first absence of voice activity; and
transmit the obtained audio segment to a server, wherein the recording of the audio is continuous from a beginning of the awakening phrase to an end of the audio segment.

2. The system of claim 1, wherein:
the system is implemented on a mobile device including a mobile phone;

the server is caused to perform the speech recognition on the audio segment and return information to the mobile device based on the speech recognition.

3. The system of claim 2, further comprising:
a display configured to display the returned information, wherein the returned information comprises texts of a machine-recognized speech corresponding to the audio segment.

4. The system of claim 1, wherein:
the audio queue is associated with time; and
to monitor the audio queue for the awakening phrase, the processor is configured to screen the recorded audio for a match with the awakening phrase.

5. The system of claim 4, wherein:
the recording of the audio in the audio queue is continuous throughout the detecting of the awakening phrase.

6. The system of claim 1, wherein:
the audio segment further comprises the awakening phrase.

7. The system of claim 1, wherein:
to obtain the audio segment from the audio queue in response to detecting the awakening phrase, the processor is further configured to:
in response to detecting the first presence of voice activity within the second preset threshold from an end of the awakening phrase, monitor the audio queue for a second absence of voice activity, wherein the second absence of voice activity corresponds to a first-detected duration in the audio queue after the first presence of voice activity with no voice recorded and exceeding the first preset threshold; and
in response to detecting the second absence of voice activity, obtain the audio segment comprising at least a portion of the audio queue from a start of the first presence of voice activity to an end of the first presence of voice activity.

8. The system of claim 7, wherein:
the first preset threshold is 700 milliseconds; and
the second preset threshold is longer than the first preset threshold.

9. A method, comprising:
recording an audio in an audio queue; and
monitoring the audio queue for an awakening phrase;
in response to detecting the awakening phrase, obtaining an audio segment from the audio queue, wherein the obtaining comprises:
monitoring the audio queue for a first absence of voice activity, wherein the first absence of voice activity corresponds to a first-detected duration in the audio queue after the awakening phrase with no voice recorded and exceeding a first preset threshold;
in response to detecting the first absence of voice activity exceeding the first preset threshold, monitoring the audio queue for a first presence of voice activity after the first absence of voice activity, wherein the first presence of voice activity corresponds to a first-detected duration with voice recorded in the audio queue after the first absence of voice activity;
in response to detecting the first presence of voice activity within a second preset threshold from an end of the awakening phrase, monitoring the audio queue for a second absence of voice activity, wherein the second absence of voice activity corresponds to a first-detected duration in the audio queue after the first presence of voice activity with no voice recorded and exceeding the first preset threshold; and in response to detecting the second absence of voice activity, obtaining the audio segment comprising at least a portion of the audio queue from a start of the first presence of voice activity to an end of the first presence of voice activity; and
transmitting the obtained audio segment to a server, wherein the recording of the audio is continuous from a beginning of the awakening phrase to an end of the audio segment.

10. The method of claim 9, wherein:
the method is implemented by a mobile device including a mobile phone;
the server is caused to perform the speech recognition on the audio segment and return information to the mobile device based on the speech recognition.

11. The method of claim 10, further comprising:
displaying the returned information, wherein the returned information comprises texts of a machine-recognized speech corresponding to the audio segment.

12. The method of claim 9, wherein:
the audio queue is associated with time; and
monitoring the audio queue for the awakening phrase comprises screening the recorded audio for a match with the awakening phrase.

13. The method of claim 12, wherein
the recording of the audio in the audio queue is continuous throughout the detecting of the awakening phrase.

14. The method of claim 9, wherein:
obtaining the audio segment from the audio queue in response to detecting the awakening phrase further comprises:
in response to not detecting the first presence of voice activity within the second preset threshold from an end of the awakening phrase, obtaining the audio segment comprising at least a portion of the audio queue from the end of the awakening phrase to a start of the first absence of voice activity.

15. The method of claim 14, wherein:
the audio segment further comprises the awakening phrase.

16. The method of claim 9, wherein:
the first preset threshold is 700 milliseconds; and
the second preset threshold is longer than the first preset threshold.

17. A non-transitory computer-readable medium, comprising instructions stored therein, wherein the instructions, when executed by one or more processors, cause the one or more processors to perform a method comprising:
obtaining a recorded audio in an audio queue; and
monitoring the audio queue for an awakening phrase;
in response to detecting the awakening phrase, obtaining an audio segment from the audio queue, wherein the obtaining comprises:
monitoring the audio queue for a first absence of voice activity, wherein the first absence of voice activity corresponds to a first-detected duration in the audio queue after the awakening phrase with no voice recorded and exceeding a first preset threshold; and
in response to detecting the first absence of voice activity exceeding the first preset threshold, obtaining the audio segment comprising at least a portion of the audio queue from an end of the awakening phrase to a start of the first absence of voice activity; and transmitting the obtained audio segment to a server, wherein the recorded audio is continuous from a beginning of the awakening phrase to an end of the audio segment.

* * * * *